Patented July 22, 1941

2,249,757

UNITED STATES PATENT OFFICE 2,249,757

ALKYL HYDROXY AROMATIC SULPHONATE

Lawrence H. Flett, Hamburg, N. Y., assignor to National Aniline & Chemical Company, Inc., New York, N. Y., a corporation of New York No Drawing. Application September 26, 1933, Serial No. 691,082

50 Claims. (Cl. 260—512)

This invention relates to a new class of alkyl hydroxy aromatic compounds. It relates more particularly to alkyl hydroxy aromatic compounds in which a higher alkyl group is directly linked to a carbon atom of the aromatic nucleus of the hydroxy aromatic compound.

The alkyl hydroxy aromatic compounds of the present invention comprise the compounds which correspond with the general formula: AHR, and especially the sulphonated alkyl hydroxy aromatic compounds of the general formula AHRS; wherein A represents an aromatic nucleus which may contain substituents; H represents a nuclear hydroxyl group; R represents a nuclear alkyl group containing at least 12, more particularly 12 to 35, preferably 14 to 23, and especially 14 to 19, carbon atoms; and S represents a nuclear sulphonic acid group in the form of the free acid or a salt. As employed in the specification and claims, the term "nuclear", when applied to a radical or group, means that the radical or group is directly linked to a carbon atom of the aromatic nucleus represented by A in the foregoing formula. For convenience the sulphonated aromatic compounds of the type AHRS will be referred to in the specification and the claims as "alkyl hydroxy aromatic sulphonates", which term generically includes said compounds, in the form of the free sulphonic acids and of the salts of the sulphonic acids. The alkyl hydroxy aromatic compounds may be employed as intermediates for the production of other products as well as for a number of useful purposes as such. The alkyl hydroxy aromatic sulphonates may be used instead of the usual soaps for scouring, cleaning, washing and toilet purposes, as well as for other purposes for which ordinary soaps have been heretofore employed. The use of ordinary soaps (alkali metal salts of higher fatty acids) for laundry and toilet purposes, as well as in various textile treating processes, is circumscribed by the fact that the ordinary soaps possess a number of properties which are undesirable. Thus they form precipitates or scums and do not lather readily when used with hard water, sea-water, or solutions containing calcium and/or magnesium compounds, and when used in acid solutions; textile materials, and especially woolen goods, washed with ordinary soaps have a harsh feel; furthermore, in view of the relatively low solubility of ordinary soaps, the washed goods must be repeatedly rinsed in order to remove residual soap. Ordinary soaps also have the disadvantage, being salts of strong bases with weak acids, of reacting alkaline in water solution, which is objectionable from the standpoint of their use in the washing of certain fine fabrics, such as delicate silks, and in connection with their use as toilet soaps. The alkyl hydroxy aromatic sulphonates may also be employed in conjunction with ordinary soaps, since they serve to prevent objectionable precipitates from forming in hard water or in acid treating baths or in salt baths. They have the further advantages of being in general better wetting agents and more soluble than the usual soaps, and of leaving the washed goods with a soft feel. Inasmuch as the water solutions of said alkyl hydroxy aromatic sulphonic acid compounds in the form of their alkali metal salts are neutral in reaction, the latter may be safely used for the washing of delicate silks and other fine fabrics as well as for personal toilet purposes. In addition to their usefulness as detergents, the alkyl hydroxy aromatic sulphonic acid compounds herein disclosed may be employed, either in the form of the free acids or their salts, as wetting, impregnating, dispersing, assisting and penetrating agents.

The said sulphonated products of the present invention include products in which the aromatic nucleus represented by A in the foregoing formula is derived from a carbocyclic or a heterocyclic, mononuclear or poly nuclear aromatic compound. The aromatic nucleus represented by A may be free from further substituents or it may contain one or more additional atoms or groups attached to the carbon or other atoms of the nucleus; the following which are some of the possible substituents, being cited merely as examples: one or more additional hydroxyl radicals besides that represented by H in the foregoing formula; one or more additional alkyl groups of the type represented by R in the foregoing formula, which may be the same or different; one or more additional sulphonic acid radicals (either in the acid or salt form) besides that represented by S in the foregoing formula; and/or one or more of the atoms or radicals Cl, Br, I, F, $NO_2$, $NH_2$, COOH, SH, $OSO_3H$, $CONH_2$, $NHR_a$, $NR_aR_b$, $COOR_a$, $COR_a$, $CONHR_a$, $OR_a$, $SR_a$, $SO_3R_a$, $OSO_3R_a$, and $R_a$ (in which $R_a$ and $R_b$ represent any alkyl, aryl, hydroaryl, alkaryl or aralkyl group or a heterocyclic radical, including groups containing an unsaturated alkyl radical, which groups or radicals may be further substituted or not and, if more than one is present, may be the same or different).

The nuclear alkyl group represented by R in the foregoing formula may be saturated or unsaturated, may contain a straight or branched carbon chain, and may be linked to a carbon atom of the aromatic nucleus through a carbon atom standing at an end of the alkyl carbon chain or at an intermediate point in said carbon chain. It may consist solely of carbon and hydrogen (a hydrocarbon chain), or it may also contain one or more substituent atoms or groups linked to one or more of the carbon atoms of the alkyl radical; as for example, halogen, $NH_2$, SH, COOH, $SO_3H$, OH, $CONH_2$, NHR', COR', COOR', SR', $OSO_3H$, OR', NR'R'', CONHR', CONR'R'', $OSO_3R'$, etc., in which R' and R'' represent any alkyl, aryl, hydroaryl, aralkyl or alkaryl radical which may or may not be further substituted and which may or may not be the same as the radicals represented by $R_a$ and $R_b$ hereinbefore referred to.

The group represented by S in the foregoing formula may be in the form of the free sulphonic acid or in the form of a salt; for example, a salt resulting either from the replacement of the hydrogen of said sulphonic acid group with its equivalent of a metal (preferably an alkali metal) or from the addition of ammonia or an organic base.

It is to be understood that the invention includes products containing a plurality of aromatic nuclei linked together by an organic or inorganic atom or radical, at least one of which aromatic nuclei contains as nuclear substituents radicals of the type S, H, and R (as defined above). Thus the invention comprehends compounds of the type AHRS—Q—AHRS, wherein Q represents an alkylene group (as for example —$CH_2$—, —$CH_2CH_2$—, etc.) The invention furthermore includes compounds of the type

AHRSO$_3$Z wherein Z represents a polyvalent metal or organic basic radical which links the grouping AHRSO$_3$ through the sulphonic acid group to another similar grouping or a different acid compound. Examples of the latter type of compound are (AHRSO$_3$)$_2$Mg,

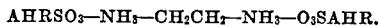

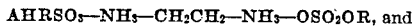

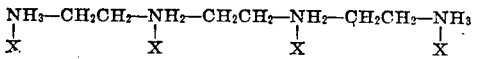

(wherein X represents a radical containing an acid group at least one of which is the radical AHRSO$_3$H), A, H and R having the meaning above defined.

The sulphonated aromatic compounds of the present invention may be prepared in various ways. According to one method of preparation, an alkyl hydroxy aromatic compound of the type AHR (in which the symbols A, H and R have the meaning defined above) may be treated with a sulfonating agent, in the presence or absence of an inert organic solvent or diluent, and in the presence or absence of a sulphonation assistant. As sulfonating agents there may be employed sulphuric acids of various strengths (e. g., 66° Bé. sulphuric acid, sulphuric acid monohydrate, oleum), chlorsulphonic acid, etc. As solvents or diluents there may be employed halogenated hydrocarbons of the aliphatic and aromatic series, as for example, carbon tetrachloride, dichlorethane, tetrachlorethane, dichlorbenzene, etc. When an inert solvent or diluent is used, it may be separated mechanically or by evaporation from the alkaline aqueous solution of the sulphonic acid salt of the alkyl hydroxy aromatic compound which results upon diluting the sulphonation mass with water and neutralizing. As sulphonation assistants there may be employed the lower organic acids and/or their anhydrides, as for example, acetic acid, acetic anhydride, etc.

The sulfonation may be carried out with the aid of heating or cooling, as required, depending upon the ease of sulphonation of the alkyl hydroxy aromatic compound and the sulphonating power of the sulphonating agents. The sulphonation of the alkyl hydroxy aromatic compound may be carried out to an extent, such that mainly one, or more or less than one, sulphonic acid group is present in the final product (based on the alkyl hydroxy aromatic compound), it depending upon the properties desired of the final product, as will appear more fully hereinafter.

The sulphonated aromatic compounds may be employed in the form of their free sulphonic acids or in the form of salts. They are preferably employed in the form of salts of metals (as for example, of the alkali metals) or of organic bases, or of ammonia, etc. The salts may be obtained in any suitable manner; for example, by reacting the sulphonated product, either in the crude form resulting from the sulphonation or in a purified form, with a metal oxide or hydroxide, ammonia or an organic base, or of a suitable salt of one of these, in an amount adapted to form a neutral product. Among the bases, oxides and salts which may be combined with the sulphonated products to produce salts are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylenediamine; triethylene tetramine; etc.

The reaction mixtures resulting from the sulphonation of the alkyl hydroxy aromatic compound may also be directly employed for the formation of mixed products, as for example, mixtures of salts of the alkyl hydroxy aromatic sulphonic acid and other acids present in said reaction mixtures, which mixtures of salts are also useful as such in accordance with the present invention. Thus, the sulphonation reaction mixture resulting from the treatment of the alkyl hydroxy aromatic compound with an amount of sulphonating agent in excess of that theoretically required to effect the desired degree of sulphonation may be treated with a suitable inorganic or organic base or basic salt (as for example, one of those mentioned) and the resulting mixture of the salt of the sulfonated alkyl hydroxy aromatic compound and the inorganic salt (as for example, sodium sulphate) may be jointly isolated from the reaction mixture and employed as such. If it is desired to produce from such mixtures a salt of the sulphonated alkyl hydroxy aromatic compound in a form substantially free from inorganic salts (for example, inorganic sulphates) this may be accomplished by taking advantage of the solubility of the salts of the sulfonated products in alcohol and other organic solvents. Thus a mixture of a salt of the sulphonated product and an inorganic sulphate may be extracted with alcohol, and the resulting extract may be evaporated to leave a residue of the purified salt of the sulphonated product.

The sulphonated products in the form of metallic salts or salts of inorganic bases are usually yellowish to white, friable solids; and in the form of salts of organic bases vary from viscous oils to semi-solids to solids. In general, the salts are readily soluble in water and in aqueous (neutral, acid or alkaline) solutions to form solutions which are faintly colored brown or yellow, which are of a soapy nature, and foam readily. Certain of the salts, such as the salts of organic polyamines, are oils which generally are insoluble in water but soluble in organic solvents (as for example, alcohol, benzene, gasoline, etc.) and in aqueous solutions of alkalis (presumably by conversion to the salts of the alkalis).

The sulphonated products may be dried in any suitable manner; as for example, in pans in shelf, atmospheric or vacuum driers; in vacuum pan or vacuum rotary driers; on atmospheric or vacuum drum driers; in spray driers; etc. The particular type of drier employed will obviously be selected with a view to the physical nature and chemical stability of the particular product. Preferably the sulphonates derived from organic bases are dried under vacuum conditions.

The invention will be illustrated by the following specific examples. It will be realized by those skilled in the art that the invention is not limited thereto, however, except as indicated in the appended patent claims. The parts are by weight.

Preparation of alkyl hydroxy aromatic compounds

*Example 1.*—Equal parts by weight of solid cetyl alcohol and anhydrous phenol are melted and mixed together. An amount of powdered anhydrous zinc chloride equal in weight to the cetyl alcohol is then added and the whole mass is refluxed for 16 to 20 hours with sufficient agitation to keep the zinc chloride in suspension, the temperature during the refluxing varying between 175° and 185° C. The condensation reaction mass is cooled and allowed to stand sufficiently to set and settle the zinc chloride, the oily layer (crude cetyl phenol) is decanted and washed with one-third of its weight of hot water (80° to 90° C.) to decompose any zinc chloride complex or double salts. Any emulsion formed during the washing is broken by the addition of small quantities of sodium chloride. The washed oil is separated from water by stratification and is then distilled under a vacuum to purify it. The fraction boiling at 170° to 240° C. at 4 mm. pressure is separately collected and represents the purified cetyl phenol. As distinguished from the isomeric normal straight chain primary cetyl phenol, which is obtained by fusion of the corresponding cetyl benzene sulfonate with caustic alkali and which is a solid melting at 77.5° C. and boiling at about 260° C. at 16 mm. pressure, the cetyl phenol of this example is a lower boiling viscous oil, practically insoluble in water but soluble in many organic solvents. It is particularly adapted for the formation of a detergent by the conversion to a sulphonated derivative. The residue boiling above 240° C. under 4 mm. pressure represents a product which, while not satisfactory for sulphonation to produce a detergent, may be sulphonated to produce a product useful as an emulsifying and/or insecticidal agent. If desired, the crude decanted, condensed product may be distilled without washing the same.

*Example 2.*—700 parts of an olefine with a boiling point ranging from 237° to 262° C. and having an average carbon content of 14 to 15 carbon atoms (and obtained by caustic soda treatment of the monochlor hydrocarbon separated by fractionation from the products resulting from chlorination of petroleum distillates which boil at approximately 250° C. at atmospheric pressure), 700 parts of phenol, and 350 parts by weight of zinc chloride are mixed and heated together while agitated under reflux condenser at a temperature around 180°–190° C. for from 5 to 16 hours. The condensed mass is diluted and washed with water until reasonably free of water-soluble impurities, and the crude brownish oil is distilled under vacuo. The distillate between 195° C. and 240° C. at 15 mm. pressure is collected. It is a faintly colored to water white oil, insoluble in water and dilute caustic soda. The product is chiefly an alkylated phenol with an average of about 14 to 15 carbon atoms in the alkyl (substituent) group.

*Example 3.*—100 parts of a chlor olefine with a boiling point ranging from 155 to 170° C. at 14 mm., having an average carbon content of about 14 to 15 carbon atoms, and containing about 63% olefine as monochlor olefine (and obtained from dichlor hydrocarbon separated by fractionation from chlorination products of petroleum distillates boiling at approximately 250° C. at atmospheric pressure), 100 parts phenol, and 50 parts zinc chloride are mixed and heated with agitation under reflux condenser to about 180°–190° C. for from 5 to 16 hours. The condensed mass is diluted and washed with water until reasonably free from water-soluble impurities and the crude brown oil is fractionally distilled under vacuo. The distillate collected between 200° to 250° C. at 13 mm. mercury pressure is a faintly colored to water-white oil, insoluble in water and dilute caustic soda, soluble in gasoline, alcohol and other organic solvents.

*Example 4.*—180 parts of gallic acid and 300 parts of the olefine used in Example 2 are mixed with 180 parts of zinc chloride and heated while agitated under a reflux condenser at 180° to 182° C. for 16 hours.

The mass is then cooled, washed with water till reasonably free of water soluble products and the resulting oil is fractionally distilled under vacuo.

The distillate boiling between 235° and 270° C. at 13 mm. pressure is collected. It is a faintly colored to water-white oil, insoluble in water, and consists chiefly of a branched-chain alkyl trihydroxy benzene with an average of about 14 to 15 carbon atoms in the alkyl group. It is noted that the condensation reaction results in the elimination of the carboxyl group originally present.

*Example 5.*—100 parts of commercial lauryl alcohol (obtained by hydrogenation of fatty acids derived from cocoanut oil and containing capryl, decyl, lauryl, myristyl, cetyl and stearyl alcohols), 100 parts of ortho cresol, and 100 parts of anhydrous zinc chloride are mixed and refluxed at 190° to 200° C. with agitation for about 16 hours. The condensation product is washed with water until practically free of water-soluble products, and the resulting oil is fractionally distilled in vacuo. The fraction of the distillate collected between 215° C. and 230° C. at 13 mm. pressure of mercury is a faint yellow to water white oil and consists of a mixture of alkyl substituted ortho cresols of which the principal components have the probable formula:

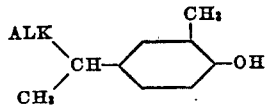

in which ALK is a straight alkyl chain of the formula $C_4H_9$, $C_6H_{13}$, $C_8H_{17}$, $C_{10}H_{21}$, $C_{12}H_{25}$, $C_{14}H_{29}$ or $C_{16}H_{33}$. The average molecular weight corresponds with a product in which the chain represented by ALK has approximately the formula $C_{10}H_{21}$.

*Example 6.*—Cresylic acid (a commercial mixture of cresols) is substituted for the ortho-cresol of Example 5.

The fraction of the distillate boiling between 215°–240° C. at 13 mm. mercury pressure is separately collected. It is a faint yellow to water-white oil comprising a mixture of alkyl derivatives of ortho-, meta-, and para-cresol.

*Example 7.*—100 parts of commercial lauryl alcohol, 153 parts of beta-naphthol, and 100 parts of anhydrous zinc chloride are mixed and refluxed with agitation for about 16 hours. The resulting condensation product is washed with water until practically free from water soluble products, and is then fractionally distilled in vacuo. The fraction of the distillate collected between 250° and 270° C. at 13 mm. mercury pressure comprises a faintly yellow colored oil which tends to crystallize in white leafy crystals. Beta-naphthol may be replaced by an equal amount of alpha-naphthol.

*Example 8.*—100 grams of commercial cetyl alcohol, 100 grams resorcinol, and 100 grams anhydrous zinc chloride are mixed and heated, with stirring, at 135° C. for 16 hours. The resulting reaction mass is washed with dilute hydrochloric acid, then with water and then distilled. The portion boiling between 240° and 280° C. at 13 mm. is collected separately, the major portion boiling between 260° and 265° C. It consists essentially of cetyl resorcinol, brown to white in color, insoluble in water but soluble in organic solvents.

*Preparation of sulphonation products of alkyl Hydroxy aromatic compounds*

*Example 9.*—100 parts by weight of the alkyl phenol obtained in accordance with Example 2, and having a boiling point ranging from 195° to 240° C. at 15 mm. pressure, are mixed with 148 parts by weight of sulphuric acid monohydrate at 30° C., then heated to 70–75° C. and held there until a sample is completely soluble in water and in neutral, acid or alkaline aqueous solutions, and does not precipitate calcium salts from a soluble calcium salt solution containing the equivalent of 0.224 gram calcium oxide per liter. The sulphonation mix is poured into water, diluted to a final volume of 450 to 600 parts, and made neutral (for example, to delta paper, congo paper, brilliant yellow, or brom-cresol-blue) with alkali, for example, caustic soda, or potash or their equivalents. The neutral solution is evaporated to dryness. If desired, the neutral solution can be clarified by filtration before being evaporated to dryness.

The product thus obtained (which will hereinafter be referred to as a tetradecyl phenol sulphonate) is a mixture of which the chief components are alkyl phenol surphonates having the probable formula:

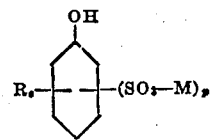

where $R_c$ represents a branched-chain aliphatic hydrocarbon group containing mainly 14 and 15 carbon atoms, M represents an alkali metal or equivalent derived from the base used for neutralization, and p is 1 or 2 but mainly 1.

In the form of the alkali metal and alkaline earth metal salts it is a faintly colored, light brown to white, friable solid, readily reduced to a comminuted or powdery form (resembling powdered soap) and is soluble in water.

The alkali metal, alkaline earth metal, and ammonium salts of the alkyl phenol sulphonic acid are solids; the salts derived from organic bases, e. g. ethylamine, pyridine, etc., are solids or liquids. Their aqueous solutions foam readily and behave like soaps. They do not precipitate lime from aqueous solutions of soluble calcium salts; they behave like tanning agents in that they precipitate glue and gelatin from acid aqueous solutions; they are soluble in acid, neutral and alkaline aqueous solutions; and they are strong hydrotropic substances, that is, possessing the quality of effecting solution in water of water-insoluble liquids and solids.

*Example 10.*—The sulphuric acid monohydrate in Example 9 is substituted by 220 parts of 66° Bé. sulphuric acid which is fed slowly to the agitated alkyl phenol at a temperature of 65–70° C. The mixture is slowly heated to 90°–100° C. and held at this temperature for one hour, or until a sample is completely soluble in water and does not precipitate calcium salts (as in Example 9). The sulfonation mixture is diluted with 1750 parts of 70% denatured alcohol, and neutralized with solid soda ash ($Na_2CO_3$). The mixture is filtered and the filtrate evaporated to dryness to obtain the sodium salt of the alkyl phenol sulphonic acid practically free from salts of inorganic acids. The resulting product is similar to that obtained in Example 9 but does not contain the inorganic salts present in that product, and is soluble in benzene and other organic solvents and the solutions are useful as a detergent. In water solution it is preferably employed as a detergent in admixture with salts or other electrolyte.

*Example 11.*—100 parts by weight of the alkyl phenol employed in Example 9 are mixed slowly with 50 parts by weight of chlorsulphonic acid, and the mix is heated to 70°–90° C. until evolution of hydrochloric acid practically ceases and a sample of the sulphonation mass is completely soluble in water and does not precipitate calcium salts (as in Example 9). The sulphonation mass is then diluted with water, neutralized with alkali, filtered and evaporated to dryness, etc., as in Example 9. The resulting product is similar to that obtained in Example 9.

*Example 12.*—100 parts by weight of the alkyl phenol used in Example 9 are mixed with 24 parts by weight of acetic anhydride, and while the mass is agitated, 132 parts of 26% oleum are added slowly, so that the temperature of the mix does not exceed 50° C. Thereafter, the temperature is slowly raised to 90°–95° C. and held there until a sample of the sulphonation mass is soluble in water and does not precipitate calcium salts.

The sulphonation mass is diluted with water to approximately 450 to 600 parts and neutralized with alkali. The solution is clarified by filtration, if necessary, and evaporated to dryness. The product is similar to that obtained in Example 9.

*Example 13.*—To 100 parts of the alkyl phenol used in Example 9, while being agitated, 64 parts of 65% oleum are added slowly. The temperature during addition of oleum is held at 30° C. while the finishing temperature is not allowed to exceed 45° C. The sulphonation is complete when a sample is completely soluble in water, and does not precipitate calcium salts. The sulphonation mass is diluted, neutralized, filtered and evaporated to dryness as described in previous examples. The neutralized solution of the sulphonic acid may be treated with such an amount of alcohol that the resulting alcohol solution in water contains more than 50% alcohol. The solution is filtered to remove precipitated impurities which are mostly inorganic salts, and the filtrate containing the sulphonate is evaporated to dryness to yield the dry sulphonate practically free from inorganic salts. The product, which is similar to that obtained in Example 10, is suitable for use in organic solvents as a cleaning composition and is an excellent emulsifier. It can be used as a detergent in aqueous solutions but for best results an electrolyte is preferably employed in conjunction therewith.

Instead of adding alcohol to the dilution mass, the dry crude sulphonate may be dissolved in a small amount of water, the solution repeatedly extracted with alcohol, and the alcohol extracts combined, filtered and evaporated to dryness.

*Example 14.*—100 parts by weight of tricosyl phenol (obtained by condensing tricosanol-7, $C_{16}H_{33}.CHOH.C_6H_{13}$, $C_{16}H_{33}$ and $C_6H_{13}$ being straight-chain alkyl groups, with phenol) are treated with 222 parts by weight of 66° Bé. sulphuric acid at 95° C. with agitation and held at that temperature for about one hour until a sample is soluble in water and does not precipitate lime salts. The product is diluted, neutralized with caustic soda, filtered, evaporated to dryness and, if desired, is further purified as described in previous examples. It comprises a secondary-alkyl phenol sulphonate containing 23 carbon atoms in a branched alkyl chain.

*Example 15.*—A mixture of alkyl cresols is prepared by condensing crude cresylic acid with the aid of zinc chloride as condensing agent with a mixture of alkyl chlorides obtained by reacting a saturated petroleum distillate having a boiling range from 220° to 240° C. and containing an alkyl hydrocarbon chain having about 13 to 14 carbon atoms with chlorine until its weight has increased approximately 18.5%. 100 parts by weight of this alkylated cresol mixture is agitated rapidly while 128 parts of 100% sulphuric acid are added with temperature of the sulphonation mixture controlled to remain around 30° C. throughout the addition. The sulphonation mass is then warmed to 75° C. and held there until a sample is completely soluble in water and does not precipitate calcium salts (about 30 minutes). The sulphonation mass is then diluted, neutralized with caustic soda, filtered and evaporated to dryness in the usual manner. The resulting product is a mixture of alkyl cresol sulphonates, of which the principal components are monoalkyl cresol sulphonates containing about 13 to 14 carbon atoms in an alkyl group some of which have a branched carbon chain.

*Example 16.*—A mixture of alkylated chlor phenols, prepared in accordance with the process of Example 15 by substituting o-chlorophenol for the cresylic acid employed therein, is sulphonated and isolated in exactly the same manner as described in Example 15. The resulting product is a mixture of alkylated o-chlorophenol sulphonates, consisting mainly of mono-alkyl derivatives of o-chlorophenol having about 13 to 14 carbon atoms in an alkyl group some of which have a branched carbon chain.

*Example 17.*—To 100 parts by weight of the product obtained in accordance with Example 3 and boiling at 200° to 250° C. at 13 mm. pressure (which probably consists of a mixture of chlor alkyl phenols and alkylene phenols), while being agitated, 148 parts by weight of sulphuric acid monohydrate are added, the temperature of the mixture being maintained at about 30° C. The temperature of the sulphonation mixture is then raised to 75° C. and held there until a sample of the mixture is completely soluble in water and does not precipitate calcium salts (about 20 minutes). The sulphonation mass is diluted with water, neutralized with caustic soda, filtered, and evaporated to dryness. The resulting product is probably a mixture of chlor alkyl phenol sulphonates and alkylene phenol sulphonates.

*Example 18.*—A mixture of alkyl phenols is made by condensing, with the aid of zinc chloride, phenol and a fraction of crude naphthenic straight run gasoline (containing unsaturated hydrocarbons) having a boiling range from 150° to 210° C., subjecting the crude condensation product to vacuum distillation, and collecting that fraction of the distillate which boils between 140° and 210° C. at 15 mm. To 100 parts by weight of this alkyl phenol mixture which is agitated rapidly, 111 parts of sulphuric acid monohydrate (100° sulphuric acid) are added, the temperature of the mixture being maintained at about 30° C. throughout the addition. Thereafter, the temperature of the reaction mass is raised to 75° C. and the mass is stirred until a sample is completely soluble in water and does not precipitate calcium salts (about 10 to 15 minutes). The sulphonation mixture is then diluted, neutralized with caustic soda, filtered and evaporated in the usual manner. The resulting product is a mixture of tertiary and secondary alkyl phenol sulphonates which possess good detergency but require somewhat large amounts to obtain white washings.

*Example 19.*—To 30 parts by weight of purified cetyl phenol (obtained, for example, in accordance with the procedure of Example 1) 36 parts by weight of 100% sulphuric acid are added with sufficient agitation to insure thorough mixing without aerating the mass; the temperature of the mass being maintained below 50° C., and the sulphuric acid being added gradually (over a period of about 5 minutes) so as to avoid exceeding this temperature. The mass is further agitated while preventing the temperature from exceeding 50° C. until the desired sulphonation has been attained (for example, for an additional period of a half hour). For production of a product which does not cause precipitation of lime salts and which forms a clear solution in dilute acid solutions, the sulphonation is carried to an extent such that a 0.5 gram sample of the sulphonation reaction mixture dissolved in 30 cc. of distilled water with the aid of stirring and gentle heating, followed by neutralization with sodium hydroxide solution until the solution reacts faintly acid to Congo red test paper, remains clear upon addition of 220 cc. of distilled water, and furthermore, when 1 cc. of a 10% $CaCl_2$ solution is added to the resulting diluted solution, the precipitate which forms disappears upon stirring, leaving a clear solution. Upon completion of the sulphonation, the sulphonation reaction mixture is poured with stirring into 275 parts by weight of water containing 23 parts by weight of sodium hydroxide, the addition being sufficiently gradual to avoid rise in the temperature of the resulting solution above 60° C. There is thus obtained sodium cetyl phenol sulphonate in an aqueous solution containing sodium sulphate in a considerable amount. The hydrogen ion concentration of the resulting solution may be adjusted to the desired value by suitable acidification or treatment with alkali. The resulting solution is dried on an atmospheric rotary drum drier heated with steam at 40 to 50 pounds pressure, the product being scraped from the rolls in a flaked or powdered form. In order to avoid corrosion of the drying rolls, the product is preferably dried in a slightly alkaline condition. The product may also be dried in shallow pans or trays in a vacuum drier at temperatures not exceeding 100° C.

*Example 20.*—100 parts by weight of purified hexadecyl (cetyl) phenol, obtained, for example, by condensation of phenol, commercial cetyl alcohol and zinc chloride followed by vacuum fractional distillation, in accordance with the procedure of Example 1, 40 parts of acetic anhydride, and 160 parts of sulphuric acid monohydrate are mixed together and warmed gently to 70°–75° C. until the product is completely soluble in water and does not precipitate calcium salts from a calcium chloride or other soluble calcium salt solution containing the equivalent of 0.224 gram calcium oxide per liter. The mass is diluted with water to a final volume of 450 to 600 parts by weight and neutralized with alkali, as for example, caustic soda or caustic potash or their equivalents. The neutral solution is clarified, if desired, by filtration, and evaporated to dryness. The product is a brown to white solid soluble in water to give brown to water white solutions, and soluble in alcohol, benzene and other organic solvents.

In this example, if crude or undistilled hexadecyl phenol is used, a product having inferior detergent properties but having valuable insecticidal and emulsifying properties is obtained.

*Example 21.*—The neutralized solution of hexadecyl phenol sulphonic acid prepared in Example 20 or the equivalent aqueous solution prepared from the final dry sulphonates, is diluted with the an equal volume of commercial denatured alcohol, thoroughly mixed for several hours, filtered and evaporated to dryness; or the dry sulphonates are extracted with successive portions of denatured alcohol, the total amount of alcohol used for this extraction being limited to approximately four times the weight of the dry unextracted sulphonate, the combined extracts are mixed and digested with a small amount of animal charcoal, filtered and evaporated to dryness. The residue obtained in either case is a hexadecyl phenol sulphonate practically free from salts of mineral acids. By adding a small amount of alkali before the evaporation, a white, friable solid having a soap-like appearance and which is readily soluble in water is obtained.

*Example 22.*—100 parts octadecyl phenol (obtained for example by condensation of stearyl alcohol, phenol and zinc chloride followed by vacuum fractionation, being a viscous oil, practically insoluble in water but soluble in many organic solvents, and having a lower boiling point than the isomeric normal straight chain primary octadecyl phenol obtained by fusion of the corresponding octadecyl benzene sulphonate with caustic alkali), 20 parts of acetic anhydride and 70 parts of 26% oleum are mixed slowly at 40° C. and gently warmed to a temperature of 80° C. until a sample is completely soluble in water and does not precipitate calcium salts from a solution of calcium chloride (or other soluble calcium salt solution) containing the equivalent of 0.224 gram calcium oxide per liter. The mass is diluted, neutralized and finished as described in Example 20.

*Example 23.*—20 parts of acetic anhydride are mixed with 100 parts by weight of para normal cetyl phenol (which is prepared by condensing palmitic acid into phenol and reducing the corresponding palmityl phenol; or by condensing palmityl chloride with benzene, reducing the corresponding ketone, sulphonating and fusing the sulphonic acid with caustic alkali in the usual manner; or by condensing n-cetyl alpha-halide with benzene, sulphonating, and fusing the sulphonic acid caustic alkali in the usual manner; or by fractional distillation of the condensation reaction mixture resulting from the interaction of phenol, cetyl alcohol and zinc chloride—cf. Example 1—and recovery of the small amount of normal cetyl phenol produced as a byproduct). To this agitated mixture, 75 parts of 25% oleum are added at such a rate that the temperature of the mix does not exceed 50° C. The mix is warmed to 85° C. and held at this temperature until a sample is completely soluble in neutral, acid and alkaline aqueous solutions, and does not precipitate any calcium salts from a solution of a soluble calcium salt containing the equivalent of 0.224 gram calcium oxide per liter. When the sulphonation is completed, the reaction mass is diluted with water to 450–600 parts and neutralized with alkali; as for example, caustic soda, potash, soda ash, etc., or their equivalents. The neutral solution is clarified, if desired, by filtration and the solution or filtrate is evaporated to dryness.

The sulphonate thus obtained may be represented in the form of the free acid by the probable formula $C_{16}H_{33}.C_6H_3.(OH).SO_3H$, or more particularly as

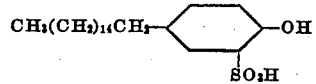

*Example 24.*—100 parts of the mixed normal alkyl phenols, obtained by condensing phenol with the mixture of free acids produced by saponifying cocoanut oil to form the mixed ketophenols and reducing the ketone phenols by the well known Clemmenson method to the normal alkyl phenols, and 20 parts acetic anhydride are mixed, and to this agitated mixture 80 parts of 26% oleum are added at such a rate that the temperature of the mix does not exceed 50° C. The mix is heated to 80° C. and held at this temperature until the desired degree of sulphonation has been attained. The mass is diluted with water, neutralized, filtered and evaporated to dryness.

The sulphonate product thus obtained comprises, chiefly, a mixture of normal alkyl phenol sulphonates in which the alkyl groups consist of straight (normal) saturated aliphatic chains containing mainly from 12 to 18 carbon atoms. In the form of the free acids the latter may be represented by the following general probable formula $$Ra.C_6H_3.(OH).SO_3H$$

or more particularly by the probable formula

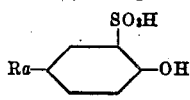

in which Ra=a normal alkyl group from $C_{12}H_{25}$ to $C_{18}H_{37}$, inclusive.

*Use of sulphonated alkyl hydroxy aromatic compounds as detergents and for related purposes*

The following examples illustrate the use of the products hereinbefore described. These examples are directed to the use of the mixed products resulting from the processes of Examples 9, 20, and 23, in the form of the sodium salts and containing sodium sulphate and other impurities resulting from the said processes, unless otherwise specified. For convenience, the said mixed products are hereinafter identified as "tetradecyl phenol sodium sulphonate," "secondary hexadecyl phenol sodium sulphonate," and "normal hexadecyl phenol sodium sulphonate," respectively. It will be understood, however, that these examples are merely illustrative and that any of the other sulphonated products herein described may be similarly employed. The parts are by weight.

*Example 25.—Cleansing composition*

1 part of normal or secondary hexadecyl phenol sodium sulphonate or 2 parts of tetradecyl phenol sodium sulphonate is dissolved in 500 parts water. The solutions are cleansers for soiled wool or other textile materials, and may be applied in any convenient or chosen manner.

Any other sulphonate or mixture of sulphonates disclosed hereinabove may be similarly employed. The sulphonates which are particularly effective are those derived from alkyl phenols containing not more than 2 (preferably 1) long chain alkyl groups, the said alkyl groups containing from 12 to 23 carbon atoms.

*Example 26.—Cleansing composition*

98 parts dry normal or secondary hexadecyl phenol sodium sulphonate are mixed with 2 parts of lauryl alcohol. The resultant mixture is applied in solution as in Example 25 as a cleaning solution for fibrous materials.

By mixing 99 parts of dry tetradecyl phenol sodium sulphonate with 1 part of lauryl alcohol a similar product is obtained which may be used as in Example 26.

*Example 27.—Scouring composition*

20 parts of dry normal or secondary hexadecyl phenol sodium sulphonate or of dry tetradecyl phenol sodium sulphonate are mixed with 80 parts of common salt. One to two parts of the mixture can be used in solution as described in Example 25.

In these mixtures common salt can be replaced by many common soluble salts, such as ammonium chloride, sodium sulphate, sodium acid sulphate, sodium carbonate, etc. Other products such as water insoluble organic compounds, for example lauryl alcohol, may be added.

The scouring solution resulting when the mixture is dissolved in water may be applied to scouring any fibrous substance such as cotton, artificial silk, silk, paper pulp, etc.

*Example 28.—Cleansing composition for wool*

An aqueous solution is made up to contain 0.5% soda ash and 0.02% of the mixture of normal alkyl phenol sodium sulphonates produced in Example 24. Raw wool which has been previously treated 15 minutes in an aqueous solution containing 0.8% soda ash at 120° F. is treated in this bath for 15 minutes at 115° F. and then rinsed. A well cleaned wool substantially free from natural fats and waxes, is obtained.

*Example 29.—Cleansing composition for wool*

An aqueous solution is made up to contain 0.5% soda ash and 0.2% of tetradecyl phenol sodium sulphonate. Raw wool which has been previously treated 15 minutes in an aqueous solution containing 0.8% soda ash at 120° F. is treated in this bath for 15 minutes at 115° F., and then rinsed. A well cleaned wool, substantially free from natural fats and waxes is obtained.

*Example 30.—Cleansing composition*

4 parts of secondary hexadecyl phenol sodium sulphonate are dissolved in 1000 parts of water. The resulting solution is a cleanser for soiled wool or other textile materials and may be applied in any convenient or chosen manner. The solution may be made in hard water or sea water without detriment to the cleansing properties of the resulting solution.

*Example 31.—Composition for cleansing*

10 parts of normal cetyl sodium sulphate, 20 parts of diisopropyl naphthalene sodium sulphonate, and 70 parts of normal or secondary hexadecyl phenol sodium sulphonate or of tetradecyl phenol sodium sulphonate are mixed. 2 parts of any of these mixtures dissolved in 500 parts of water produce an excellent cleansing solution for cotton, silk, wool or rayon.

*Example 32.—Composition preventing soap deposits from hard water*

A mixture of 1 part of a good grade of soap (e. g., Marseilles) and 1 part of normal or secondary hexadecyl phenol sodium sulphonate or 2 parts of tetradecyl phenol sodium sulphonate is added to hard water in the proportion of 2 grams of the mixture per liter of water. (The hard water may contain the equivalent of, for example, as much as 0.404 calcium oxide in the form of a salt in solution—so-called 40° hardness.) The presence of the sodium cetyl or tetradecyl phenol sulphonate inhibits the precipitation of any insoluble soap (insoluble alkaline earth metal salts of soap) in the form of curds or visible (or tacky) deposits.

*Example 33.—Cleansing composition*

95 parts of normal or secondary hexadecyl phenol sodium sulphonate from which inorganic salts have been removed by treatment with alcohol (see Example 21) are mixed with 5 parts of sodium palmitate. A solution in water equivalent to 1 part of this mixture in 500 parts water is prepared and forms an excellent cleansing solution for wool. The solution may be made from soft or hard water, and may be acid, neutral or alkaline. There is no precipitation of lime soaps or free fatty acid and the solutions obtained are clear.

Any member or mixture of members of the class of alkyl hydroxy aromatic sulphonates above disclosed may be similarly employed, but the preferred sulphonates are those containing not more than 2, and preferably only 1, long chain alkyl group, the said alkyl group containing from 12 to 18 carbon atoms.

Sodium palmitate may be replaced by palmitic acid, or a mixture of sodium palmitate and palmitic acid, or any other ordinary fatty acid soap, such as, "Ivory soap," "Lux," castile soap, etc. Even when palmitic acid is incorporated as above, the mixture is resistant to hard water giving a clear solution.

*Example 34.—Solvent composition*

An aqueous solution is made by dissolving 20 parts of normal or secondary hexadecyl phenol sodium sulphonate or of tetradecyl phenol sodium sulphonate, which has been practically freed from salts of inorganic acids by alcohol treatment (see Examples 10, 13 and 21), in 20 parts of water. While this cold solution is agitated thoroughly, 60 parts of mineral oil (white oil viscosity 85) are added very slowly to insure excellent mixing. The resulting creams disperse readily in water to give substantially stable mineral oil emulsions suitable for textile or parasiticidal purposes.

In addition to their usefulness as detergents, as hereinbefore described, the alkyl hydroxy aromatic sulphonic acids and their salts may also be employed as wetting, impregnating, dispersing, assisting, tanning and insecticidal agents, as will be illustrated by the following additional examples. Unless otherwise specified, the products employed in these examples are the mixed products containing inorganic salts and designated above as normal and secondary hexadecyl phenol sodium sulphonates and tetradecyl phenol sodium sulphonate. The parts are by weight.

*Example 35.—Wetting composition*

An aqueous solution is made at room temperature containing 1 part of normal or secondary hexadecyl phenol sodium sulphonate per 100 parts of water. A one inch square of rabbit-hair hat felt about $\frac{5}{32}$ inch thick is wetted by the solution in about 75 seconds.

*Example 36.—Wetting composition*

An aqueous solution is made at room temperature containing 1 part of tetradecyl phenol sodium sulphonate per 200 parts of water. A ball containing short raw cotton fibres and having a diameter of about 0.75 inch is wetted in about 20 to 25 seconds.

*Example 37.—Wetting composition*

A mixture is made of 5 parts of p-tertiary-amyl phenol and 95 parts of normal or secondary hexadecyl phenol sodium sulphonate. One part of this mixture is dissolved in 100 parts water. The resulting solution wets a one-inch square of rabbit-hair hat felt about $\frac{5}{32}$ inch thick in 50 seconds.

*Example 38.—Wetting composition*

A mixture is made of 5 parts of p-tertiary amyl phenol and 95 parts of tetradecyl phenol sodium sulphonate. One part of this mixture is dissolved in 200 parts water. The solution wets a ball containing short raw-cotton fibres and having a diameter of about 0.75 inch in about 7 seconds.

*Example 39.—Composition for wetting and for application as a parasiticide*

2 parts by weight of tetradecyl phenol (as prepared in Example 2) are mixed with 50 parts of tetradecyl phenol sodium sulphonate. The mixture is converted to a paste by addition of 20 parts by weight of water. One part of the resulting paste dissolved in 100 parts by weight of water form a solution valuable as a wetting agent and as a parasiticide. The solution will wet a piece of raw cotton batting (dimensions 1" x 1" x ¼") in about 12 seconds. The solution is also useful as a germicide.

*Example 40.—Bleaching of cotton cloth*

0.4 to 1 gram of normal or secondary hexadecyl phenol sodium sulphonate or 1 to 2 grams of tetradecyl phenol sodium sulphonate is added per 100 cc. of a sodium hypochlorite solution containing 0.7% available chlorine. Heavily woven, unbleached cotton cloth (e. g. "Black Rock") or unbleached cotton yarn (42 ply) is immersed in this solution at room temperature for about 5 minutes, squeezed, exposed to the air until bleached (about an hour), and then rinsed and treated with antichlor in the well known manner.

The sodium cetyl or tetradecyl phenol sulphonate present improves penetration to such an extent that the necessary time of immersion is reduced markedly (and may be as much as 20%). By their colloidal action the sulphonates serve as protective agents, and by reducing the drastic action of the sodium hypochlorite, they help to prevent over-bleaching or formation of oxycellulose and subsequent weakening of the fibre.

This process is also of value in removing dye from cotton fibres, for example in the stripping of sulphur dyes.

*Example 41.—Stripping composition*

A stripping solution containing 10 per cent of sodium hydrosulphite is prepared by dissolving the hydrosulphite in cold water and adding thereto 10 grams of normal or secondary hexadecyl phenol sodium sulphonate or from 2 to 4 grams of tetradecyl phenol sodium sulphonate per liter of solution. Yarn to be stripped is immersed in this solution, and thereafter the temperature is gradually raised to the boiling point; more hydrosulphite is added as needed. After 10 minutes a skein of worsted yarn dyed with 1 per cent of its weight of Lake Orange A (Colour Index No. 151) is stripped completely at 50° C., while a skein treated in the same manner but without the alkyl hydroxy aromatic sulphonic acid is still colored a pale orange after ten minutes.

The effect of the cetyl or tetradecyl phenol sodium sulphonate is very marked, and is evidenced by the rapidity with which the fabric is penetrated and stripped by the solution.

*Example 42.—Impregnating composition*

One gram of normal or secondary hexadecyl phenol sodium sulphonate or 1 to 1.5 grams of tetradecyl phenol sodium sulphonate are added to 100 grams of a 20% latex solution. The mixture forms a very stable emulsion with which fabric, e. g., cotton cloth, may be rapidly and thoroughly impregnated by passing the fabric through the emulsion. The sodium sulphonates impart to the emulsified latex composition great penetrating power, so that it enters the fiber uniformly and quickly, and does not give rise to mere surface coatings which strip rapidly.

The marked penetrating power of the emulsified latex composition may be illustrated by placing a one inch square of rabbit-hair felt about 3/8 inch thick on the surface of the solution. The felt will be completely penetrated in 1 minute and 40 seconds, whereas a solution which does not contain the alkyl phenol sulphonate, but which is otherwise identical, will not completely penetrate an identical piece of felt even after 5 minutes.

Example 43.—Bowking composition 2 grams of normal hexadecyl phenol sodium sulphonate or 4 grams of tetradecyl phenol sodium sulphonate are added for each liter of the usual bowking solution of alkali and soap. The bowking process (e. g. kier-boiling) is accomplished as usual. With the alkyl phenol sulphonate present, the bowking treatment is complete in approximately 75% of the time otherwise required, more complete emulsification of waxes and their removal from the treated fabric are effected, and the deposition of soap curds (alkaline earth metal salts of soap) on the material is entirely prevented by the dispersive action of the alkyl phenol sulphonate.

Example 44.—Fulling composition 2 ounces of palm soap are dissolved in 1 gallon of water. One ounce of normal or secondary hexadecyl phenol sodium sulphonate or 2 ounces of tetradecyl phenol sodium sulphonate is added, and the mix is stirred until complete solution is obtained. This solution is added as required to the fulling mill in which the fabric is being subjected to the fulling operation. The effect of the addition of the sodium alkyl phenol sulphonate is very marked in reduction of the time required for rinsing after the fulling operation and in the prevention of any hard water soap deposits in and on the fibre.

Example 45.—Composition for dyeing Celanese 1 gram of normal or secondary hexadecyl phenol sodium sulphonate or 2 grams of tetradecyl phenol sodium sulphonate is added for every liter of dye solution charged to a dye bath for dyeing "Celanese" fabric (cellulose esters) with dyes for cellulose esters.

The effective dispersion of the dye and the improved penetrating power of the dye bath, induced by the presence of the alkyl phenol sulphonate, results in greater depth and brilliancy of shade on the dyed fabric and prevents occlusion of the dispersed dye.

Example 46.—Dyeing composition

A 10 gram skein of scoured woolen yarn is dyed at the boil for one hour in the following dye bath:

0.15 gram National Cyanone R (Colour Index No. 289)
2.5 cc. of 1% sodium bichromate solution,
5.0 cc. of 10% acetic acid solution,
0.5 gram of normal or secondary hexadecyl phenol sodium sulphonate or 1 gram of tetradecyl phenol sodium sulphonate, and
500 cc. of water.

The alkyl phenol sulphonate imparts great penetrating power to the dye solution, which results in improved leveling (uniformity of shade).

In the dyeing of felts, this effect is marked and of particular value since the dye is carried into and combined with the fiber throughout the fabric.

Example 47.—Composition for mordanting 3 parts of normal or secondary hexadecyl phenol sodium sulphonate or of tetradecyl phenol sodium sulphonate are dissolved in 400 parts of water. An unbleached cotton skein weighing 10 parts is thoroughly wetted in the solution and excess solution removed. The skein may be given a light rinse, if desired. It is then immersed in a dye solution containing 1 part of Victoria Green WB dissolved in 400 parts water. The skein absorbs the dye quickly, and shows great capillarity. The dyed skein is then rinsed thoroughly. It is dyed a heavy shade of green. A skein prepared and dyed in a similar manner without the presence of the sulphonate in any of the solutions is only slightly stained.

Example 48.—Aftertreatment of dyeings

A solution of 2 grams of normal or secondary hexadecyl phenol sodium sulphonate, or 4 grams of tetradecyl phenol sodium sulphonate, per liter of water at room temperature is prepared. Dyed fabrics, especially such as have been dyed with vat dyes (for example, Carbanthrene Blue GCD—Color Index No. 1113, Carbanthrene Yellow G—Color Index No. 1118, etc.) or with developed dyes (such as combinations arising from Naphthol AS, etc.) are boiled for about a half hour in the resulting alkyl phenol sulphonate solution. The brilliancy of color is considerably improved, and crocking is overcome by this aftertreatment.

Example 49.—Vat dyeing

A vat dye bath is made up by mixing:
1 gram of a vat dye—e. g., Vat Pink FF,
0.2 gram of normal or secondary hexadecyl phenol sodium sulphonate or of tetradecyl phenol sodium sulphonate,
3 cc. of 30° Bé. caustic soda solution, and
1.5 grams of sodium hydrosulphite, in
500 cc. of water at 85° to 90° C.

When the dye bath is in a reduced state (i. e., about 15 to 20 minutes after the above bath mixture reaches 85° to 90° C.) it is diluted to 400 cc. A 20 gram skein of cotton yarn is immersed therein, dyed for 40 minutes in a cooling bath, and finished in the usual manner.

The presence of the alkyl phenol sulphonate in the dye bath results in improved level shades of greater strength and brilliancy.

Example 50.—Emulsion for softening tanned leather 6 grams of normal or secondary hexadecyl phenol sodium sulphonate, or 12 grams of tetradecyl phenol sodium sulphonate, are dissolved in 80 cc. of water at room temperature and the solution is stirred for some time with 80 grams of neat's-foot oil. The resulting mixture on dilution in the fat liquoring bath forms an emulsion of neat's-foot oil with superior and rapid penetrating and softening power when applied as a softening agent to leather. As compared with the effect of neat's-foot oil when used alone, the mixture penetrates the leather much more rapidly (in about 75% of the time) and thoroughly. In addition, it inhibits mildew on the treated leather.

Example 51.—Composition for tanning and process 20 parts of normal or secondary hexadecyl phenol sodium sulphonate or of tetradecyl phenol sodium sulphonate and 1 part of glacial acetic acid are dissolved in 1000 parts of water. Sheepskin is treated with this solution for 36 hours or until tanning is complete. If the bath becomes exhausted, more sulphonate can be added.

Other tanning agents may be admixed with the above tanning composition.

Example 52.—Mercerizing cotton

A solution of 1 gram of normal or secondary hexadecyl phenol sodium sulphonate, or of 1 to 2 grams of tetradecyl phenol sodium sulphonate, in 10 cc. of water is thoroughly stirred into 100 cc. of a 30° Bé. caustic soda solution. The material to be mercerized is steeped in this solution under tension for about 5 minutes, after which it is washed under tension with dilute hydrochloric acid and scoured in the usual manner. The greater penetrating power of the solution induced by the presence of the alkyl phenol sulphonate results in an appreciable reduction of time required for full effect of the mercerizing solution, and a more thorough penetration.

Example 53.—Carbonizing composition 0.25 gram normal or secondary hexadecyl phenol sodium sulphonate, or 0.5 gram of tetradecyl phenol sodium sulphonate, are added to each 100 cc. of a carbonizing liquid consisting of a 6° Twaddell sulphuric acid solution. Wool cloth containing cellulosic matter, such as burrs, sticks, etc. is run through this solution at a moderate speed at room temperature, then squeezed or whizzed, then through a drying and heating oven at 170° to 190° F., after which the cloth is washed, soaped and finished as usual. The effect of the alkyl phenol sulphonate is very marked in increasing the wetting and penetration of the goods by the carbonizing liquor, thereby reducing the time necessary for the operation and assuring a more complete decomposition of the cellulosic matter, and in acting as an anti-acid in protecting the wool during the drying operation.

Example 54.—Scouring and carbonizing composition 2 parts of normal or secondary hexadecyl phenol sodium sulphonate or of tetradecyl phenol sodium sulphonate are dissolved in 1000 parts (by volume) of 6° Twaddell sulphuric acid. Wool is scoured in this solution and then dried and carbonized without further treatment. The hexadecyl and tetradecyl phenol sodium sulphonates may be replaced by any other sulphonate, mixture of sulphonates, or corresponding free acid or acids of the above type. The preferred sulphonates and sulphonic acids are those derived from alkyl phenols containing not more than 2, and preferably only 1, long-chain alkyl group, said alkyl group preferably containing from 12 to 18 carbon atoms.

Example 55.—Dyeing composition of the Naphthol-AS type

An impregnating solution is made up to contain 100 cc. water, 6 grams Naphthol-AS, 12 cc. Turkey red oil, 12 cc. caustic soda solution (30° Bé.) and 1 gram of normal or secondary hexadecyl phenol sodium sulphonate or 2 grams of tetradecyl phenol sodium sulphonate. This mixture is warmed to 170° to 180° F. until solution is complete and then diluted to a volume of 1 liter. 16 grams of salt, and 3 cc. of 37% formaldehyde are then added and the whole is allowed to cool to about 100° F. The cloth to be impregnated is treated with this solution at about 100° F. by the usual methods, e. g., padding. The presence of the alkyl phenol sulphonate in the impregnating solution imparts greatly increased penetrating power to this solution and results in improved quality, strength and brilliancy of shades obtained upon development of dye on the fabric.

Example 56.—Lake pigment manufacture 1 gram of Lake Orange A (Colour Index No. 151) and 1 gram of normal or secondary hexadecyl phenol sodium sulphonate, or of tetradecyl phenol sodium sulphonate, are dissolved in 100 cc. of hot water. To this solution is added 200 cc. of aluminum hydrate paste (3 grams on dry basis), and the lake is precipitated at 70° C. with 100 cc. of a 10 per cent barium chloride solution. The lake pigment is then filtered off, washed, and dried in the usual manner. The effect of the alkyl phenol sulphonate is to disperse the pigment in fine form, thereby getting a much stronger shade of color than when the procedure is carried out without addition of the alkyl phenol sulphonate.

It will be realized by those skilled in the art that changes may be made in the products, and in the processes of preparing them, hereinbefore described, without departing from the scope of the invention.

Thus, the sulphonated alkyl hydroxy aromatic compounds may be prepared in various ways from various intermediates; for example, a hydroxy aromatic compound of the type AH may be condensed with an alkylating agent adapted to substitute an alkyl group of the type R in the aromatic nucleus, and the resulting compound of the type AHR then may be sulphonated; or an alkyl ether of an aromatic compound of the type A, in which an alkyl group of the type R is linked by an oxygen atom to the aromatic nucleus, may be rearranged to the alkyl hydroxy aromatic compound and sulphonated before or after the rearrangement; or an aromatic compound of the type A which does not contain a hydroxyl group (as for example, an aromatic hydrocarbon), but which may or may not contain one or more nuclear sulphonic acid groups, may be condensed with an alkylating agent adapted to substitute an alkyl group of the type R in the aromatic nucleus, followed by sulphonation to substitute one or more sulphonic acid groups in the aromatic nucleus (if not already present); the alkylated aromatic sulphonic acid may then be fused with caustic alkali to form the corresponding alkyl hydroxy aromatic compound or the corresponding alkyl hydroxy aromatic sulphonic acid compound, and, if necessary, the product may be sulphonated; or the alkyl group R may be substituted in the aromatic nucleus in the form of a ketone by condensing the aromatic compound, hydroxy aromatic compound, aromatic sulphonic acid compound or hydroxy aromatic sulphonic acid compound with a long-chain fatty acid or acid chloride (corresponding with the desired alkyl group R) in place of an alkylating agent in the processes just enumerated, and subsequently reducing the resulting ketone at any stage of the process.

In the production of the alkyl hydroxy aromatic compounds of the type AHR by condensation of an alkylating agent with a hydroxy aromatic compound of the type AH, suitable hydroxy aromatic compounds which may be employed are, for example, a phenol, a naphthol, a hydroxy heterocyclic aromatic compound, or derivatives thereof. As alkylating agents there may be employed non-aromatic alcohols (as for example, straight-chain, primary monohydric alcohols; straight-chain, secondary monohydric alcohols; branched-chain primary alcohols; branched-chain secondary alcohols; tertiary alcohols of all types, etc.), olefine hydrocarbons containing straight- or branched-chains and containing one or more double bonds which may be variously located in the hydrocarbon, halogen derivatives of the hydrocarbons (as for example, chlorides or bromides of the saturated and unsaturated hydrocarbons of the aliphatic class), etc., and derivatives of all of these, all containing at least 12 carbon atoms in the alkyl chain.

As condensing agents there may be employed anhydrous zinc chloride, anhydrous aluminum chloride, anhydrous antimonic chloride, anhydrous ferric chloride, zinc, sulphuric acid 66° Bé., monohydrate, oleum), etc. The particular condensing agent and conditions employed vary with the alkylating agent employed. Preferably the proportion of alkylating agent employed with respect to the hydroxy aromatic compound is such that not more than two of the said alkyl radicals of the type represented by R in the foregoing formula are contained in the resulting alkyl hydroxy aromatic compound, and preferably only one. Thus, at least 1.25 mols of hydroxy aromatic compound per mol of alkylating agent is preferably employed in the condensation. A ratio as low as 1 to 1 may be employed, but the yield of the resulting alkyl hydroxy aromatic compound containing one long alkyl group will be less. Further, the amount of condensing agent employed may vary over a wide range. For example, in using zinc chloride as the condensing agent, much less of it is generally required in condensing an alkyl chloride with an aromatic hydroxy compound than when an alcohol is condensed with a hydroxy aromatic compound; in general, a long-chain alcohol (as for example, lauryl or cetyl alcohol) requires about an equal weight of zinc chloride for best results, whereas a chlorinated long-chain hydrocarbon requires only about 5 to 10 per cent of its weight of zinc chloride.

The time during which the condensation reaction of the hydroxy aromatic compound and the alkylating agent may be carried out also may be varied and will depend on the nature of the alkylating agent. In general the condensation between an alcohol and a hydroxy aromatic compound is practically complete within about 3 to about 5 hours at refluxing temperature but the quality of the product appears to be improved by continuing the heating, as disclosed and claimed in copending application of Jack D. Robinson, Serial No. 42358, filed September 26, 1935. The condensation of an alkyl chloride with a hydroxy aromatic compound is satisfactorily complete in about 1 hour at refluxing temperature or in about 3 to 6 hours at 135° C. With zinc chloride as the condensing agent, the period of heating may be extended to 16 hours or more without seriously harming the quality or decreasing the yield of the alkyl hydroxy aromatic compound. The crude alkyl hydroxy aromatic compound resulting from the condensation is preferably purified, as for example, by distillation, and the purified compound is preferably employed for sulphonation to produce a detergent in view of the resulting superior detergent properties.

As has been indicated above, in sulphonating the alkyl hydroxy aromatic compound, an inert solvent and/or a sulphonation assistant may or may not be used. The temperature at which the sulphonation is carried out may vary within wide limits. For example, temperatures as low as about 0° C. and as high as about 140° C. may be employed. In general the more vigorous the sulphonating agent the lower is the preferred temperature. Ordinarily the completion of the sulphonation is carried out at a temperature of about 50° to about 80° C. The ratio of sulphonating agent employed to alkyl hydroxy aromatic compound also may be varied. While the preferred amounts are given in the above examples, an amount of sulphuric acid or other sulphonating agent ranging from ½ to about 5 parts by weight of sulphonating agent per part by weight of the alkyl hydroxy aromatic compound may be employed.

While, as has been indicated above, various alkyl hydroxy aromatic compounds containing one or more hydroxyl groups, one or two nuclear alkyl groups having 12 or more carbon atoms in a chain which may or may not be further substituted, one or more sulphonic acid groups, and which may be further substituted, may be employed as detergents in accordance with the present invention, those compounds which are derived from a phenol of the benzene series, which contain only one nuclear alkyl group having 12 to 23 carbon atoms in a branched alkyl chain (but may contain additional lower alkyl groups), and which are sulphonated to an extent substantially corresponding with the monosulphonic acid compound, are of special importance.

The extent to which the sulphonation is carried out may vary with the individual material being sulphonated and the use to be made of the sulphonated product. In some cases, a degree of sulphonation which corresponds with a product having maximum detergent properties is not completely soluble in water to form a clear solution and/or may cause some precipitation of lime salts. On the other hand, a product which causes no precipitation of lime salts may not have maximum obtainable detergent properties because of excessive sulphonation. Furthermore, in some cases the degree of sulphonation may not be the same for products to be used as detergents in soft water, in hard water and in alkaline solutions. It is to be noted, however, that by the employment of an alkylated hydroxy aromatic compound which has been purified by fractional vacuum distillation, less variation in the detergent properties and less precipitation of lime salts of the sulphonated product from hard water occurs than when a relatively less pure alkyl hydroxy aromatic compound is sulphonated.

It is to be noted that in using the sulphonated products mixtures of two or more of the sulphonated products hereinbefore referred to may be employed. Furthermore, any of the said sulphonated products or their mixtures may be employed in connection with other hydrotropic substances; dispersing, emulsifying and/or penetrating agents; aliphatic or aromatic sulphonic acids; acid alkyl esters of sulphuric acid; sulphonation products of petroleum oil; alkyl aryl sulphonates free from a nuclear hydroxyl group; and/or their derivatives.

In addition to the above described uses of the sulphonated products of the present invention and in recapitulation of the various uses hereinbefore described for said products, it is noted that the said sulphonated products may be employed for a large variety of purposes wherein cleansing, dispersing, penetrating, wetting, tanning, surface tension lowering, and similar action is required.

Thus the said sulphonic acids and their salts may be incorporated into compositions containing laundry and toilet soaps, water insoluble dyes, sulphurized oils, hydrocarbons, alcohols, esters, alkyl amines, mixed amines, fats, oils, waxes, unguents, alkyl phenols, ketones, mineral oils, resinous substances, alkyl sulphates, organic acids of an aromatic or aliphatic nature, inorganic bases, organic bases, inorganic salts, inorganic acids, etc.

The said sulphonic acid products are of great value where dispersion is required, including emulsification, suspension, colloidal solution, conversion into foam (aeration), reduction of surface tension effects, as well as detergency. The said sulphonated products are of particular value in treating natural or artificial fibrous substances such as cotton, wool, silk, hair, straw or any other animal or vegetable fiber, artificial silks, rayon, hides, skins, leather, paper, feathers, etc.; for example in dyeing with water-soluble or water-insoluble dyes, the presence in the dye-containing composition of alkyl hydroxy aromatic sulphonate products causes the dyestuff to be well dispersed in, and imparts great penetrating power to, the treating composition containing the dye whereby levelling, brilliancy and fastness characteristics of the shade of the dye, as well as penetration of the dye into the fiber, are enhanced.

Because of their hydrotropic nature, the said sulphonic acids and their salts are valuable ingredients of compositions in which solids and liquids which are insoluble or almost insoluble in water are desired to be held in solution or colloidal suspension or are desired to be solubilized, as for example, inks (e. g. printing inks).

The said sulphonates can be incorporated in compositions prepared and applied with any kind of dye or mixture of dyes, as for example, acid, basic, chrome, developing, direct, sulphur or vat dyes, or aniline black, or the so-called "ice colors," etc. They may be used in baths or preparations of any kind and used for dyeing, printing, padding, stencilling, stamping, developing or coloring fibrous material in any manner whatsoever. The compositions can be employed in baths or preparations containing dispersed or solubilized water-insoluble dyes and can be applied, for example, to fibrous material made of or containing artificial silk.

In the preparation of fibrous material, compositions containing these sulphonates can be applied to increase penetration of treating solutions into the fiber and such improvement of penetrating power is had regardless of the alkaline, neutral or acid nature of the solution, and is effective in all manner of processes, such as bowking, bleaching, cleaning, carbonizing, degreasing, dry-cleaning, felting, finishing, greasing, impregnating, lubricating, lathering, laundering, mercerizing, softening, stripping, scouring, sizing, washing and wetting. In acid treating baths, as for example, in wool carbonizing baths or acid-dyeing baths, the said sulphonates act as anti-acid and acid-protective agents. Their detergent properties in acid solution permit, for example, scouring of raw wool in an acid carbonizing bath.

The said sulphonates appear to react with silk and protect it, as for example, against staining by cotton dyes. The said sulphonates further have the valuable property of imparting excellent, and often unusually intensive, dispersing, emulsifying and penetrating characteristics to compositions containing them, which thereby become valuable active agents in processes for the removal of grease, wax, soap deposits, etc.; in processes for cleansing, scouring, bowking, degreasing; or in processes requiring the rapid transfer of active agents into the fiber (such as acid in carbonizing; dye or intermediate solutions and dispersions in dyeing, padding, printing, etc.; latex solution in impregnating; caustic soda in mercerizing; hypochlorite in bleaching; hydrosulphite in stripping; etc.).

Compositions containing the said sulphonates for finishing, lubricating, sizing, and soaping fibrous material are effective and rapid in action. They inhibit the deposition of insoluble soaps in baths which contain hard water and soaps, and sometimes completely prevent precipitation of lime soaps.

The said sulphonates may also be employed to permit more uniform precipitation of artificial silk in a precipitating bath, better washing of nitro cellulose in a steeping and washing bath, more uniform lubrication of threads by a spinning bath, greater penetration and cleansing with a dry cleaning bath. Fibrous materials impregnated with a solution of the said sulphonates have a marked, increased imbibing or absorption power for the varied treating solutions and compositions commonly applied to such material.

The said sulphonates can be incorporated and applied in tanning compositions alone or in combination with other tanning and/or treating compositions for leather, skins, etc.

Their dispersing power makes them valuable ingredients for making aqueous compositions comprising dispersions of pigments, insoluble substances such as vat dyes, colloidal sulphur, blanc-fixe, soot, minerals, etc., and in the making of pigments, inks, plastics, etc. The dispersions may be made in any desirable manner; as by adding the solid, in friable or finely divided form, to a dilute or concentrated solution of the said sulphonates; or the sulphonates may be incorporated with the solid, before addition to aqueous media; or the insoluble substance may be caused to form in the composition by means of, or in the presence of, the sulphonates, as for example, by mixing an organic soluble dye and an appropriate metal salt solution to form a lake pigment in an aqueous medium, or by precipitating a basic dye or dyes from an aqueous solution or upon a fiber, by addition thereto of the sulphonates in the solutions.

The said sulphonates are valuable ingredients in electrolytic baths inducing by their presence more uniform depositions from electrolytes.

The said sulphonates are also valuable stabilizing agents for diazonium and nitroso preparations, and prevent their rapid decomposition. They combine readily with diazo preparations of this type to precipitate stable compounds capable of being dried and handled without fear of rapid decomposition. They are accordingly valuable ingredients in compositions containing diazonium or nitroso or preparations applied to fibrous materials by dyeing, printing, padding and generally related processes.

The said sulphonates possess the valuable property of dispersing gases in liquids, thereby imparting to their solutions strong foaming and frothing qualities. They are valuable components of compositions and processes requiring frothing or foaming, as for example, in dyeing textile materials by foam methods; in protecting oxidizable baths (e. g. reduced dye baths) against oxidation by air; in the separation of minerals by flotation; in aerating liquids and washing of gases; and in fire extinguishing preparations.

The emulsifying, dispersing and wetting power imparted to compositions containing the said sulphonates makes them valuable components of cosmetic preparations such as hair washes, dentifrices, cleansers, toilet soaps, mouth washes; as well as of germicides, insecticides, fungicides, parasiticides, etc., in which preparations they cause emulsification and uniform dispersion of active ingredients, and impart strong penetrating and wetting properties which insure intimate contact with surfaces to which the preparations are applied. For the same reasons, they are valuable ingredients of oils applied as boring oils, lubricants, etc. for products such as leather, or for spinning processes, or for machinery; and of aerated liquids or compositions for holding and washing gases.

They are valuable components of compositions and processes applied to the production of sterile products such as sterile starch, glue, wood, gelatine, etc.

The wetting, dispersive and detergent properties imparted to compositions containing the said sulphonates also make them highly valuable ingredients and/or substitutes for soap, as in soap dye preparations of all kinds.

In all cases where desired, they may be incorporated in compositions containing protective colloids, such as glue, soap and/or gelatine when used under conditions which do not cause precipitation thereof.

The said sulphonates also possess the property of altering ultra-violet light in the direction of the visible spectrum. Accordingly, they can be incorporated in compositions, particularly in organic solvents in which they are soluble, to be applied for the purpose of preventing sunburn, or other objectionable action of ultra-violet light. They may be applied to convert ultra-violet light to visible light, and thus serve as dyes or pigments for substances to be viewed under ultraviolet light.

The said sulphonates, by their power to impart reduced surface tension to compositions containing them, are valuable agents in processes for breaking oil emulsions.

The free sulphonic acids are effective and valuable fat-saponifying agents.

The said sulphonates may also be employed as intermediates for the preparation of other chemical compounds. Inasmuch as they contain a phenolic hydroxyl group they may be employed as coupling components for azo dyes.

Compositions containing these sulphonates in solution are not confined to such as are made with and contain water as the essential liquid medium. Water is preferred, but may be replaced by alcohol or other solvent as required or found desirable and in which the sulphonate is soluble.

Solutions in organic solvents of the organic amine salts, whether water-soluble or insoluble, of said sulphonic acids are particularly suitable as such or in admixture with other substances for use in dry-cleaning of fibers, fabrics and other material.

In addition to their use as intermediates for the production of other products, the alkyl hydroxy aromatic compounds of the type AHR may be employed as detergents in the form of solutions in alcohol-water mixtures containing caustic alkali; as insecticides, germicides, parasiticides, or vermicides; as wetting agents in conjunction with emulsifying agents; as assistants in emulsification; as solvents; as intermediates for the production of resins of all kinds in which phenols are reacted with resin-forming ingredients of various types; as plasticizers for resinous products, cellulose plastics, and other synthetic and natural plastics of all types; as intermediates for the production of azo dyestuffs useful for the dyeing of cellulose esters and ethers, and/or soluble in organic solvents; as inhibitors of gum formation in gasoline (for example, tetra-decyl-pyrogallol and related alkyl polyhydric phenols); etc.

It will be understood that, in general, the alkyl phenol sulphonates prepared and used in accordance with the present invention differ from each other with respect to their wetting, emulsifying, detergent and other properties, and that these properties are more or less altered and/or differently affected by the presence therewith of inorganic salts and other products and/or impurities. For example, the detergent powers of one alkyl phenol sulphonate may be relatively greater than that of another alkyl phenol sulphonate while the wetting powers are relatively less and the presence of sodium sulphate may affect or alter the detergent powers or properties more than it does the wetting properties. It is evident, therefore, that in the uses of the alkyl phenol sulphonates these differences in properties should be taken ordinarily into account provided comparable results are to be obtained as to any particular use.

Methods of making the alkyl phenol compounds and their sulphonates, certain of the alkyl phenol compounds and sulphonates, and certain uses thereof, disclosed in the present application, are claimed in one or more of my copending applications Serial No. 691,081, filed of even date herewith; Serial No. 737,777, filed July 31, 1934; Serial Nos. 42,155, 42,156 (Patent 2,133,287, issued October 18, 1938), 42,157, 42,158 (Patent 2,134,711, issued November 1, 1938), 42,159 (Patent 2,134,712, issued November 1, 1938), 42,162, 42,163 (Patent 2,133,288, issued October 18, 1938), and 42,164, filed September 25, 1935; Serial No. 42,354, filed September 26, 1935 (Patent 2,166,136, issued July 18, 1939); Serial Nos. 93,718 and 93,-719, filed July 31, 1936; and Serial No. 186,733, filed January 24, 1938.

I claim:

1. A mixture of a plurality of sulphonated hydroxy aromatic compounds which, in the form of the free sulphonic acid, corresponds with the formula AHRS, wherein A represents an aromatic hydrocarbon radical, H represents a nuclear hydroxyl group, R represents an alkyl hydrocarbon group directly linked to a carbon atom of the aromatic nucleus represented by A and containing at least 12 carbon atoms, and S represents a sulphonic acid group, the alkyl groups represented by R being derived from the mixture of alcohols obtained by reducing the fatty acids of cocoanut oil.

2. An alkyl hydroxy aromatic sulphonate in which the alkyl, hydroxy, and sulphonate groups are nuclear substituents and the alkyl group contains at least 12 carbon atoms.

3. An alkyl hydroxy aromatic sulphonate in which the alkyl, hydroxy, and sulphonate groups are nuclear substituents and the alkyl group contains 12 to 23 carbon atoms.

4. An alkyl hydroxy aromatic mono-sulphonate in which the alkyl, hydroxy, and sulphonate groups are nuclear substituents and the alkyl group contains 12 to 23 carbon atoms in a branched carbon chain.

5. An alkyl hydroxy aromatic sulphonate in which the alkyl, hydroxy, and sulphonate groups are nuclear substituents and the alkyl group is an open chain hydrocarbon radical containing at least 12 carbon atoms and linked to the aromatic nucleus by an intermediate carbon atom of the chain.

6. An alkyl hydroxy aromatic sulphonate in which the alkyl, hydroxy, and sulphonate groups are nuclear substituents and the alkyl group is an open chain hydrocarbon radical containing 14 to 19 carbon atoms and linked to the aromatic nucleus by an intermediate carbon atom of the chain.

7. An alkyl hydroxy aromatic sulphonate in which the alkyl, hydroxy, and sulphonate groups are nuclear substituents and the alkyl group is an open chain hydrocarbon radical containing 12 to 23 carbon atoms in an alkyl hydrocarbon chain of which at least 11 carbon atoms are in a straight chain.

8. An alkyl hydroxy aromatic sulphonate in which the alkyl, hydroxy, and sulphonate groups are nuclear substituents and the alkyl group is an open chain hydrocarbon radical containing 12 to 18 carbon atoms, of which at least 11 carbon atoms are in a straight chain, and linked to the aromatic nucleus by an intermediate carbon atom of the chain.

9. An alkyl hydroxy mono-sulphonate of an aromatic hydrocarbon in which the alkyl, hydroxy, and sulphonate groups are nuclear substituents and the alkyl group contains at least 12 carbon atoms.

10. An alkyl hydroxy mono-sulphonate of an aromatic hydrocarbon in which the alkyl, hydroxy, and sulphonate groups are nuclear substituents, and the alkyl group is an open chain hydrocarbon radical containing at least 12 carbon atoms and linked to the aromatic nucleus by an intermediate carbon atom of the chain.

11. An alkyl hydroxy sulphonate of an aromatic hydrocarbon in which the alkyl, hydroxy, and sulphonate groups are nuclear substituents and the alkyl group is an open chain hydrocarbon radical containing 12 to 23 carbon atoms of which at least 11 carbon atoms are in a straight chain.

12. An alkyl hydroxy aromatic sulphonate in the form of the sodium salt in which the alkyl, hydroxy, and sulphonate groups are nuclear substituents and the alkyl group contains 12 to 23 carbon atoms.

13. An alkyl hydroxy sulphonate of an aromatic hydrocarbon in the form of the sodium salt in which the alkyl, hydroxy, and sulphonate groups are nuclear substituents and the alkyl group is an aliphatic hydrocarbon radical containing 12 to 23 carbon atoms in a branched carbon chain.

14. An alkyl hydroxy aromatic sulphonate in the form of the sodium salt in which the alkyl, hydroxy, and sulphonate groups are nuclear substituents and the alkyl group is an open chain hydrocarbon radical containing at least 12 carbon atoms of which at least 11 carbon atoms are in a straight chain.

15. An alkyl hydroxy sulphonate of an aromatic hydrocarbon in the form of the sodium salt in which the alkyl, hydroxy, and sulphonate groups are nuclear substituents and the alkyl group is an open chain hydrocarbon radical containing 12 to 23 carbon atoms in an alkyl hydrocarbon chain of which at least 11 carbon atoms are in a straight chain.

16. An alkyl hydroxy sulphonate of an aromatic hydrocarbon in the form of the sodium salt in which the alkyl, hydroxy, and sulphonate groups are nuclear substituents and the alkyl group is an open chain hydrocarbon radical containing 12 to 19 carbon atoms and linked to the aromatic nucleus by an intermediate carbon atom of the chain.

17. A process of producing an alkyl hydroxy aromatic sulphonate which comprises forming an alkyl hydroxy aromatic compound in which the alkyl and hydroxy groups are nuclear substituents by condensing an alkylating agent containing at least 12 carbon atoms and selected from the group consisting of an alcohol, an olefine hydrocarbon and an alkyl halide with at least one molecular equivalent of a hydroxy aromatic compound, with the aid of a metal halide condensing agent, and sulphonating the resulting alkyl hydroxy aromatic compound.

18. A process of producing an alkyl hydroxy aromatic sulphonate which comprises forming an alkyl hydroxy aromatic compound in which the alkyl and hydroxy groups are nuclear substituents by condensing an alkylating agent containing 12 to 23 carbon atoms and selected from the group consisting of an alcohol, an olefine hydrocarbon and an alkyl halide with at least one molecular equivalent of a hydroxy aromatic compound, with the aid of a metal halide condensing agent, and sulphonating the resulting alkyl hydroxy aromatic compound.

19. A process of producing an alkyl hydroxy aromatic sulphonate which comprises forming an alkyl hydroxy aromatic compound in which the alkyl and hydroxy groups are nuclear substituents by condensing an alkylating agent containing 14 to 19 carbon atoms and selected from the group consisting of an alcohol, an olefine hydrocarbon and an alkyl halide with at least one molecular equivalent of a hydroxy aromatic compound, with the aid of a metal halide condensing agent, and sulphonating the resulting alkyl hydroxy aromatic compound.

20. The long chain mono-alkylated phenols obtainable by reacting phenols with normal aliphatic alcohols having chains containing at least 12 carbon atoms in the presence of a dehydrating agent, said products being characterized by the fact that their melting and boiling points are less than those of isomeric normal straight chain primary alkyl phenols which are made by fusion of alkyl benzene sulphonates with caustic alkali.

21. The long chain mono-alkylated phenols obtainable by reacting phenols with normal saturated aliphatic alcohols having chains containing at least 12 carbon atoms in the presence of a dehydrating agent, said products being characterized by the fact that their melting and boiling points are less than those of isomeric normal straight chain primary alkyl phenols which are made by fusion of alkyl benzene sulphonates with caustic alkali.

22. The long chain mono-alkylated phenols obtainable by condensing mono-nuclear phenols with primary saturated aliphatic alcohols containing chains of at least 12 carbon atoms in the presence of an inorganic dehydrating agent, said products being characterized by the fact that their melting and boiling points are less than those of isomeric normal straight chain primary alkyl phenols which are made by fusion of alkyl benzene sulphonates with caustic alkali.

23. The long chain alkylated phenols obtainable by condensing mono-nuclear phenols with primary saturated aliphatic alcohols containing chains of at least 12 carbon atoms in the presence of anhydrous zinc chloride, said products being characterized by the fact that their melting and boiling points are less than those of isomeric normal straight chain primary alkyl phenols which are made by fusion of alkyl benzene sulphonates with caustic alkali.

24. The long chain alkylated phenols obtainable by condensing approximately one mol of a mono-nuclear phenol containing not more than two hydroxy groups with at least one-half mol of primary saturated aliphatic alcohols containing chains of 12 to 20 carbon atoms in the presence of anhydrous zinc chloride at a condensation temperature not greatly above the reflux temperature, said products being characterized by the fact that their melting and boiling points are less than those of isomeric normal straight chain primary alkyl phenols which are made by fusion of alkyl benzene sulphonates with caustic alkali.

25. The long chain mono-alkylated phenols obtainable by reacting a mono-nuclear phenol containing not more than two hydroxy groups with dodecyl alcohol in the presence of an inorganic compound capable of functioning as a dehydrating agent at the reaction temperature, said products being characterized by the fact that their melting and boiling points are less than those of the isomeric normal dodecyl mononuclear phenol which is made by reduction of the corresponding normal dodecylyl mononuclear phenol.

26. The long chain alkylated phenols obtainable by condensing a mono-nuclear phenol containing not more than two hydroxy groups with dodecyl alcohol in the presence of anhydrous zinc chloride, said products being characterized by the fact that their melting and boiling points are less than those of the isomeric normal dodecyl mononuclear phenol which is made by reduction of the corresponding normal dodecylyl mononuclear phenol.

27. The process of preparing long chain alkylated phenols which comprises condensing a mono-nuclear phenol containing not more than two hydroxy groups with dodecyl alcohol in the presence of anhydrous zinc chloride, cooling the reaction mixture, purifying the reaction mixture, and distilling the products.

28. The long chain alkylated phenols obtainable by condensing a dihydric mono-nuclear phenol with dodecyl alcohol in the presence of anhydrous zinc chloride, said products being characterized by the fact that their melting and boiling points are less than those of the isomeric normal dodecyl dihydric mononuclear phenol which is made by reduction of the corresponding normal dodecylyl dihydric mononuclear phenol.

29. The process of making long chain alkylated phenols which comprises condensing dodecyl alcohol with a dihydric mono-nuclear phenol in the presence of anhydrous zinc chloride at a condensation temperature, cooling the reaction mixture, washing it with water, and distilling the product to obtain the long chain alkylated dihydric phenol.

30. The long chain alkylated phenols obtainable by condensing a mono-nuclear phenol with the mixture of alcohols obtained by hydrogenating coconut oil in the presence of an inorganic compound capable of functioning as a dehydrating agent at the reaction temperature.

31. The long chain alkylated phenols obtainable by condensing a dihydric mono-nuclear phenol with the mixture of long chain alcohols obtained by hydrogenating coconut oil in the presence of anhydrous zinc chloride.

32. The process of making long chain alkylated phenols which comprises heating and stirring the mixture of alcohols obtained by hydrogenating coconut oil, a dihydric mono-nuclear phenol, and anhydrous zinc chloride; cooling the product, washing it with water, and distilling to obtain the long chain alkylated phenols.

33. The long chain alkylated phenols obtainable by condensing approximately two mols of a monohydric mono-nuclear phenol with one mol of a primary saturated aliphatic alcohol containing a chain of 12 to 18 carbon atoms in the presence of an inorganic dehydrating agent, said products being characterized by the fact that their melting and boiling points are less than those of isomeric normal straight chain primary alkyl phenols which are made by fusion of alkyl benzene sulphonates with caustic alkali.

34. The long chain alkylated phenols obtainable by condensing approximately two mols of a monohydric mono-nuclear phenol with one mol of a primary saturated aliphatic alcohol containing a chain of from 12 to 18 carbon atoms in the presence of anhydrous zinc chloride, said products being characterized by the fact that their melting and boiling points are less than those of isomeric normal straight chain primary alkyl phenols which are mad by fusion of alkyl benzene sulphonates with caustic alkali.

35. The method of producing nuclear alkyl derivatives of phenols, which comprises heating at a condensation temperature a reaction mixture containing a phenol compound selected from the group consisting of phenol and its monomethyl derivatives, an aliphatic monohydric alcohol containing at least 12 carbon atoms, and zinc chloride as a condensing agent.

36. A nuclear alkyl phenol prepared by heating at a condensation temperature, a reaction mixture containing a phenol compound selected from the group consisting of phenol and its mono-methyl derivatives, an aliphatic monohydric alcohol containing at least 12 carbon atoms, and zinc chloride as a condensing agent.

37. A sulphonated mono-alkylated-hydroxy-benzene containing an alkyl group of at least 12 carbon atoms.

38. A nuclear sulphonated mono-alkylated-hydroxy-benzene containing an alkyl group of 12 to 18 carbon atoms.

39. Compounds having the following general formula:

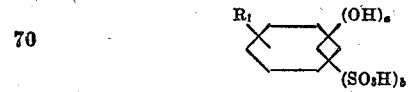

wherein $R_1$ represents an alkyl group containing 12 to 18 carbon atoms, and $a$ and $b$ represent integers not greater than two.

40. Compounds having the following general formula:

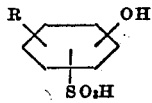

wherein R represents an alkyl group containing 12 to 18 carbon atoms.

41. The compounds defined in claim 39 in the form of their water-soluble salts.

42. The compounds defined in claim 40 in the form of their water-soluble salts.

43. A sulphonated mono-alkylated-hydroxy-aromatic compound containing an alkyl group of at least 12 carbon atoms.

44. A sulphonated mono-alkylated hydroxy benzene containing a nuclear alkyl group containing at least 12 carbon atoms.

45. Compounds having the general formula

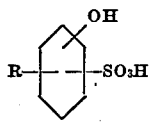

wherein R represents an open chain alkyl group containing at least 12 carbon atoms.

46. The long chain mono-alkylated phenols obtainable by reacting phenols with normal primary aliphatic alcohols having chains containing at least 12 carbon atoms in the presence of a dehydrating agent, said products being characterized by the fact that their melting and boiling points are less than those of isometric normal straight chain primary alkyl phenols which are made by fusion of alkyl benzene sulphonates with caustic alkali.

47. The long chain mono-alkylated phenols obtainable by reacting phenols with normal primary saturated aliphatic alcohols having chains containing at least 12 carbon atoms in the presence of a dehydrating agent, said products being characterized by the fact that their melting and boiling points are less than those of isometric normal straight chain primary alkyl phenols which are made by fusion of alkyl benzene sulphonates with caustic alkali.

48. A nuclear mono-sulphonated mono-alkylated hydroxy aromatic compound containing an alkyl group of at least 12 carbon atoms.

49. A nuclear mono-sulphonated mono-alkylated hydroxy benzene containing a nuclear alkyl group containing at least 12 carbon atoms.

50. A mixture of nuclear mono-sulphonated nuclear mono-alkylated mono-hydroxy benzenes comprising essentially a mono-sulphonated mixture of chloralkyl phenols and alkylene phenols obtained by condensing phenol with a mixture of olefines and monochlor olefins having an average carbon content of 14 to 15 carbon atoms.

LAWRENCE H. FLETT.